UNITED STATES PATENT OFFICE.

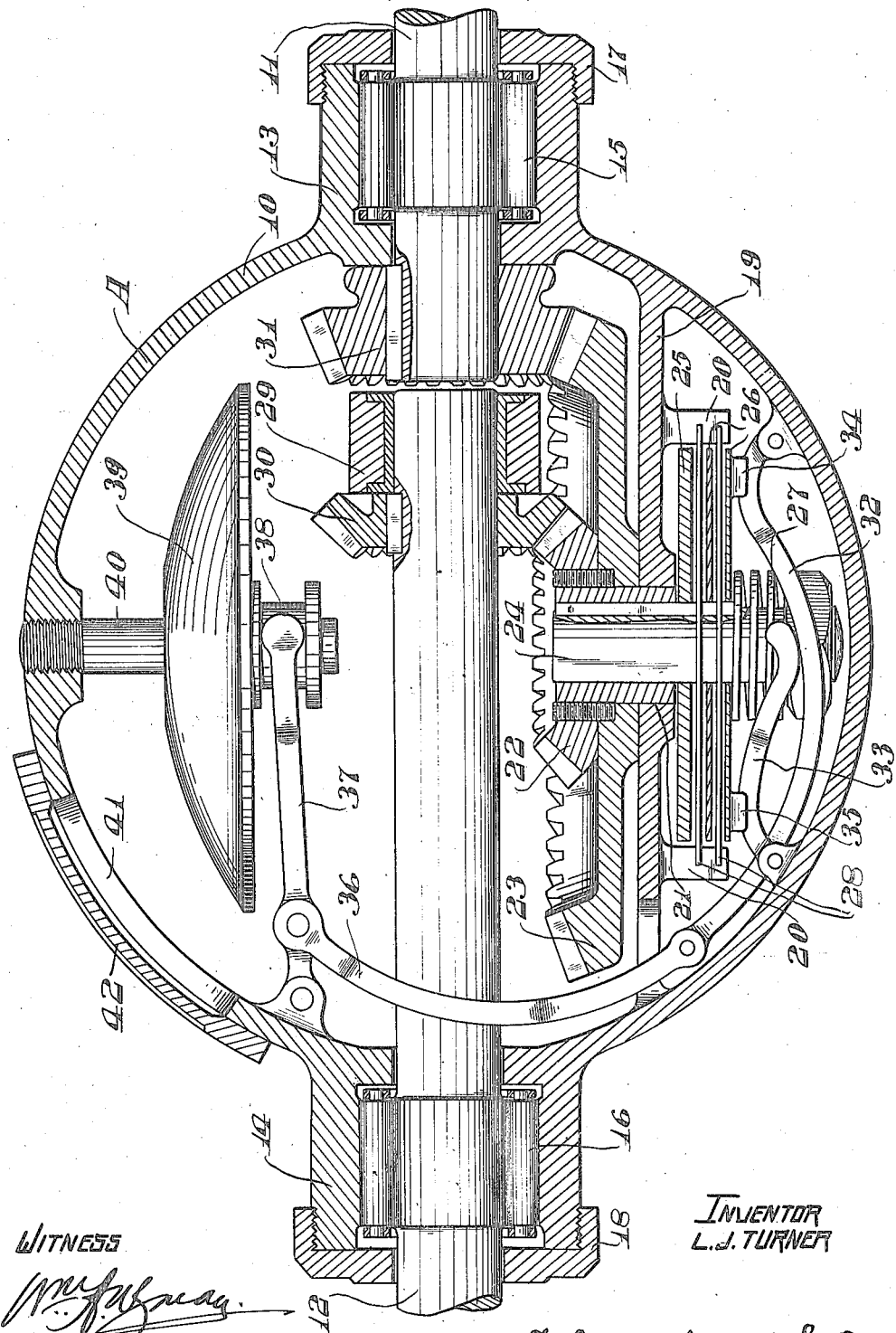

LOUIS JOSEPH TURNER, OF OTTAWA, ONTARIO, CANADA.

AUTOMATIC POWER-TRANSMISSION MECHANISM.

1,180,343.

Specification of Letters Patent.

Patented Apr. 25, 1916.

Application filed June 11, 1915. Serial No. 33,492.

*To all whom it may concern:*

Be it known that I, LOUIS JOSEPH TURNER, a subject of the King of Great Britain, and resident of the city of Ottawa, Province of Ontario, Dominion of Canada, have invented certain new and useful Improvements in Automatic Power-Transmission Mechanism, of which the following is the specification.

This invention relates to improvements in automatic power transmission particularly adapted for use on automobiles, motor boats and the like, and the objects of the invention are to automatically adjust the power to meet the requirements of the speed as the resistance to motion of the car or boat varies and to dispense with the use of hand actuated levers.

With cars at present in use, especially when taking hills, the speed and momentum is considerably reduced in interchanging the gears, and a further object of the invention is to overcome this objection and permit of the power being automatically changed without the necessity of interchanging the gears.

Further objects still are to simplify the construction and reduce the number of working parts, and generally to adapt the transmission mechanism to better perform the functions required of it.

With the above objects in view, the invention consists essentially of the improved construction particularly described and set forth in the following specification and accompanying drawings forming part of the same.

In the drawing, the figure represents a sectional elevation of the improved transmission mechanism.

Referring to the drawing, A represents the improved transmission mechanism comprising the casing 10 designed to be rotatably mounted on the main shaft 11 and the power transmission shaft 12 which are in alinement and may be of any usual construction well known in the art.

It is essential that the friction between the casing 10 and the shafts 11 and 12 should be eliminated as far as possible and to this end the said casing is provided on diametrically opposite sides with hollow bosses 13 and 14 carrying anti-friction roller bearings 15 and 16 adjustably mounted therein and adapted to embrace the said shafts. These bosses 13 and 14 are preferably closed at their outer ends by the covers 17 and 18 rotatably engaging the main and transmission shafts respectively and making threaded engagement with the said bosses. The casing also carries an integral longitudinally extending member 19 arranged substantially parallel to the axes of the shafts 11 and 12 and provided with downwardly extending lugs 20 and a concentric orifice 21 with which the boss of the beveled pinion 22 rotatably engages.

In the embodiment illustrated the pinion 23 is concentrically mounted on the boss of the beveled pinion 22 to which it is rigidly attached by screws or the like and is located between the said beveled pinion and the longitudinally extending member 19.

The beveled pinion 22 is rigidly mounted on the spindle 24 provided intermediate of its length with a disk 25 rigidly mounted thereon and carrying a plurality of friction disks 26, the object of which will be made clear hereafter. Jarring, due to any slight longitudinal motion of the spindle 24 is controlled by the spiral spring 27 taking therearound and located between the lower friction disks 26 and the nut threaded on the end of the said spindle.

Coöperating with the friction disks 26 and located therebetween are a plurality of non-rotatable disks 28 slidably mounted on the lugs 20 and designed to automatically adjust the frictional resistance to the rotation of the beveled pinion 22 and 23, thereby rotating the casing 10 on the shafts.

The shaft 12 is rotatably supported at its inner end in a suitable bearing 29 formed integral with the casing 10 and carries a beveled pinion 30 adapted to mesh with the beveled pinion 22 while the main shaft 11 is provided on its inner end with a beveled pinion wheel 31 designed to mesh with the beveled pinion wheel 23.

When motion is transmitted from the main shaft 11 to the beveled pinion 23 through the medium of the beveled pinion 31 the friction disks 26 are adapted to coact with the non-rotatable disks 28 and to this end I provide offset levers 32 and 33 pivoted at one end to the inner periphery of the casing 10 and provided intermediate of their ends with bearing blocks 34 and 35 located on diametrically opposite sides and designed to slidably engage the outer of the said friction disks.

The lever 33 is adapted to be simultaneously operated with the lever 32 and for this purpose the outer end of the first said lever engages the inner face of the second said lever. The free end of the lever 32 is pivotally connected to one end of the link 36, the other end of which is pivotally attached to the lever 37, the shorter arm of which is pivotally mounted on the casing 10 and the longer arm provided with a bifurcated end adapted to embrace the collar 38 formed integral with the balance weight 39 slidably mounted in the spindle 40 threaded in the casing 10 and located diametrically opposite the longitudinally extending member 19.

To facilitate in supplying oil to the bearings and also to provide means for inspecting the gearing, a doorway 41 is formed in the casing and provided with a suitable cover 42 capable of being removed, if found desirable.

As the power is transmitted from the main shaft 11 to the pinion 31 the intermeshing pinion 23 is rotated and simultaneously rotates the pinion 22 thereby transmitting the motion to the transmission shaft 12 through the medium of the beveled pinion 30 intermeshing with the beveled pinion 22.

As the momentum of the shafts 11 and 12 increases the casing 10 rotates thereon, and due to this motion the balance weight 39 is subjected to a centrifugal action and slides upon the spindle 40, the motion being transmitted through the lever 37 and link 36 to the levers 32 and 33 causing the bearing blocks 34 and 35 to engage the outer disk 26 pressing the same into engagement with the non-rotatable disks 28, so controlling the resistance offered to the rotation of the pinion wheels 22 and 23, and giving the desired momentum to the casing.

It will be seen that a car fitted with a transmission gearing of this description, when about to ascend a hill, will automatically develop the necessary power and come to the desired speed without in any way interfering with the operation of the engine. The increase of load while tending to retard the operation of the transmission shaft 12 also tends to reduce the rotary motion of the casing 10 so that the balance weight 39 slides on the spindle 40 inwardly toward the center of the casing and relieves the pressure of the blocks 34 and 35 on the disks 26, permitting the momentum of the said casing to automatically adjust itself.

Although in the drawing the friction disks 26 and non-rotatable disks are shown apart it will be understood that this is only for the sake of rendering the location of the several parts clear, but in practice the non-rotatable disks 28 and friction disks 26 are in close proximity to each other so that the slightest movement of the main shaft 11 and transmission shaft 12 is sufficient to cause the disks to engage, thereby giving the initial rotary motion to the casing.

What I claim as my invention is:

1. The combination with a main and a transmission shaft, of a casing rotatably mounted on the shafts, and means for automatically adjusting the power of the transmission shaft as the power on the main shaft changes including a slidably mounted balance weight.

2. The combination with a main and a transmission shaft, of a casing rotatably mounted on the shafts, an integral support within said casing, a train of gearing in the casing operatively connecting the said shafts, coacting clutch elements carried by said support and certain of said gears, and centrifugal means for governing the operation of said clutch and thereby the rotary motion of the casing.

3. The combination with a main and a transmission shaft, of a casing rotatably mounted on the shafts, an integral support within said casing, a train of gearing in the casing operatively connecting the shafts, certain of said gears being journaled on said support, and centrifugal means for controlling the rotary motion of the casing.

4. The combination with a main and a transmission shaft, of a casing, a train of gearing operatively connecting the shafts, a plurality of non-rotatable disks mounted in the casing, a plurality of friction disks coacting with the non-rotatable disks and operatively connected to the gearing and centrifugal means for controlling the engagement of the said friction and non-rotatable disks.

5. The combination with a main and a transmission shaft, of a casing, a pair of beveled pinions carried by the casing and concentrically arranged relatively to each other, beveled pinions mounted on the ends of the main and transmission shafts and intermeshing with the first said beveled pinions, non-rotatable disks, friction disks operatively connected to the first said beveled pinion adapted to coact with the non-rotatable disks, a pair of levers engaging with the friction disks, and means for simultaneously operating the said levers.

6. The combination with a main and a transmission shaft, of a casing, a train of gearing in the casing operatively connecting the shafts, a plurality of non-rotatable disks, a plurality of friction disks coöperating with the non-rotatable disks adapted to control the frictional resistance to motion of the gearing, a pair of levers coacting with the friction disks, a link connecting one of the said levers, a third lever pivotally connected to the link, and a slidably mounted balance weight operatively connected to the last said lever.

In witness whereof I have hereunto set my hand in the presence of two witnesses.

LOUIS JOSEPH TURNER.

Witnesses:
 JAMES MITCHELL,
 F. E. DIXON.